United States Patent Office 3,463,741
Patented Aug. 26, 1969

3,463,741
COBALT CONTAINING CATALYSTS OXYGEN REGENERATED TO FORM COBALTOSIC OXIDE
Edmund R. Russell, Longview, Tex., assignor to Eastman Kodak Company, Rochester, N.Y., a corporation of New Jersey
No Drawing. Filed Feb. 12, 1964, Ser. No. 344,227
Int. Cl. B01j *11/68, 11/06*
U.S. Cl. 252—416    5 Claims

ABSTRACT OF THE DISCLOSURE

Cobalt containing hydroformylation catalysts are regenerated to a high state of activity by a process which comprises contacting the spent catalyst with molecular oxygen at a temperature in the range of about 400° to about 620° C. The regenerated catalysts are employed in the ozo process for the manufacture of aldehydes, alcohols, and other useful oxygenated materials.

---

This invention relates to catalytic chemical processes and more particularly to a novel process for regenerating a spent hydroformylation catalyst which has been used for the preparation of carbonyl compounds from olefins, carbon moxoxide and hydrogen and to hydroformylation processes employing the regenerated catalyst.

The hydroformylation catalysts to which the process of my invention is applicable are those containing a cobalt oxide, the catayltically active form of which is cobaltosic oxide. The cobalt oxide catalysts are generally employed in a hydroformylation process as a slurry in an organic or aqueous medium and can contain, in addition to a cobalt oxide, a catalyst carrier or support material. Such carriers or supports are well known in the art and include various oxides of large surface area such as diatomaceous earth, alumina, finely divided asbestos, powdered silica, synthetic and natural clays, etc.

Heretofore many hydroformylation catalysts have generally been regenerated by contacting the catalyst with a reducing atmosphere such as hydrogen, etc. I have unexpectedly discovered that spent hydroformylation catalysts of the type previously described can be regenerated to a high degree of activity by contacting the catalyst with molecular oxygen at a temperature of about 400° C. to about 620° C.

The process of my invention is particularly adapted for use in conjunction with hydroformylation processes in which the catalyst is ground, e.g., in a gas-heated ball-mill, as a part of the catalyst regeneration procedure or prior to use in the process. The description of my invention which follows will have particular reference to such a hydroformylation process.

The catalyst to be regenerated is first dried in order to remove any organic materials from the solid components of the catalyst slurry. The drying of the catalyst should be carried out at a temperature sufficiently high to vaporize or decompose any organic materials which are present. It is necessary to carry out the drying step at elevated temperatures even when the catalyst is slurried in an aqueous medium because of the organic impurities which are contained therein. Suitable drying temperatures are from about 350° C. to about 400° C. with the higher temperatures in the stated range being preferred.

The drying of the catalyst can be conveniently accomplished while grinding the catalyst in a ball-mill by heating the ball-mill to an elevated temperature, preferably from about 350° C. to about 400° C. The drying of the catalyst can be facilitated by passing steam through the ball-mill. After the drying of the catalyst is complete, the ball-mill is preferably purged with in inert gas in order to remove any combustible gases from the ball-mill.

The contacting of the dried catalyst with molecular oxygen is begun by passing a mixture comprising oxygen and steam through the ball-mill while maintaining a ball-mill temperature of about 400° C. to about 620° C. The amount of steam passed through the ball-mill is gradually reduced until only oxygen or an oxygen containing gas is being introduced into the ball-mill. Air is the preferred oxygen-containing gas for catalyst regeneration. In general, the higher temperatures in the range of about 400° C. to about 620° C. are preferred for the regeneration of the catalyst. However, because of the necessity of drying the catalyst at a temperature of about 350° C. to about 400° C. and because of the time required to raise the temperature of the ball-mill to the higher temperatures in the stated range, the regeneration of the dry catalyst by contact with molecular oxygen is normally initiated at about 400° C. and continued while the ball-mill is being heated to the higher temperature. The temperature of the ball-mill should not be allowed to exceed about 620° C. Above this temperature the dry catalyst is converted to an inactive form, perhaps because the active component, cobaltosic oxide ($Co_3O_4$) is converted to an inactive form, cobaltous oxide (CoO) by reaction with carbon resulting from the decomposition of organic materials during the drying step.

When air is used as the source of molecular oxygen, the catalyst is considered regenerated when the off-gas from the ball-mill contains at least about 18 percent oxygen and less than about 1 percent carbon dioxide. In general, this requires about 12 to about 36 hours, depending on variables such as the temperature of contact, the air flow rate through the ball-mill, the initial activity of the catalyst, etc.

The regenerated catalyst is then cooled, preferably to about 200° C. by blowing oxygen-containing gas, e.g., air, through the ball-mill. The catalyst is then preferably further cooled to about 150° C. by purging the ball-mill with an inert gas. The inert gas purge is for safety purposes and is generally discontinued when the oxygen content of the off-gas is not more than 0.5 percent. The cooled regenerated catalyst is now suitable for slurrying, preferably with an organic liquid for use in a hydroformylation process. A hydroformylation catalyst regenerated in the described manner unexpectedly exhibits a higher activity than a similar catalyst regenerated by conventional means, e.g., reduction to cobalt metal.

A typical sample of regenerated catalyst comprising a cobalt oxide and diatomaceous earth has the following analysis:

| | Percent |
|---|---|
| Cobaltosic oxide ($Co_3O_4$) | 17.5 |
| Cobaltous oxide (CoO) | 5.5 |
| Cobalt as metal and carbide ($Co_2C$) | 0.1 |
| Cobalt orthosilicate ($Co_2SiO_4$) | 42.6 |
| As carbon, organics and water | 1.1 |
| Iron (approximately) | 1.0 |
| Catalyst support (a diatomaceous earth) | 33.3 |

As previously mentioned, the regeneration of the catalyst by air is generally considered complete when the off-gas from the ball-mill contains at least 18 percent oxygen and no more than 1 percent carbon dioxide. Another method of ascertaining the completion point of the regeneration of the catalyst is to determine when the amount of cobaltosic oxide ($Co_3O_4$) is greatest. Cobaltosic oxide appears to be the active oxide of cobalt for use in a hydroformylation process. A hydroformylation catalyst regenerated in this manner exhibits unexpectedly high catalytic activity when used for the preparation of aldehydes in the so-called "oxo" process. Catalysts of this type, when regenerated by the described procedure, are particularly useful in the preparation of butyraldehydes from propylene and exhibit a superior catalytic activity in such processes. The use of such regenerated catalysts results in an unexpectedly high rate of aldehyde production per unit weight of catalyst. Thus, my invention also includes the process for preparing a butyraldehyde by contacting propylene with carbon monoxide and hydrogen at elevated temperature and pressure in the presence of a cobalt oxide-containing hydroformylation catalyst which has been regenerated by the procedure described herein. Such a catalyst, containing a large portion of the cobalt in the form of cobaltosic oxide is especially useful in such a process. Especially preferred in the process of my invention are those catalysts comprising a cobaltosic oxide and diatomaceous earth.

The following examples illustrate the catalyst regeneration procedure of the invention.

Example 1

A spent hydroformylation catalyst was regenerated by feeding the catalyst to a ball-mill, drying the catalyst by heating the ball-mill to a temperature less than 400° C., regenerating the dried catalyst by contacting it with air at about 440° C. until off-gas analysis indicated completion of regeneration, and then contacting the dried catalyst with air at a temperature of about 600° C. for about 2 hours.

Samples of the catalyst were taken periodically during the regeneration process and analyzed for cobalt metal and cobaltosic oxide ($Co_3O_4$).

Table I, below, shows the analyses of the various samples.

TABLE I

| Sample No. | Time of sampling | Percent Co metal | Percent $Co_3O_4$ |
|---|---|---|---|
| 1 | Starting catalyst | 30.6 | 0.0 |
| 2 | After drying of catalyst | 30.0 | 0.0 |
| 3 | After 1 hour of contact at 440° C | 27.8 | 0.0 |
| 4 | At end of contact at 440° C | 0.0 | 32.0 |
| 5 | At end of contact at 600° C | 0.0 | 43.2 |

The data in Table I, above, indicate that the contact of the spent catalyst with air at 440° C. converts all of the cobalt to an cobaltous oxide (CoO) and cobaltosic oxide and the additional contacting of the catalyst with air at 600° C. completes the conversion of the cobaltous oxide to cobaltosic oxide, the active form of the catalyst.

Example 2

A spent hydroformylation catalyst was regenerated in the same ball-mill used in Example 1. The catalyst was dried by the method of Example 1 and was then contacted with air at a temperature of 600° C. until the off-gas analysis indicated completion of catalyst regeneration. The catalyst was then contacted with air at about 600° C. for an additional two hours and was then contacted with air at about 700° C. for two more hours.

Smples of the catalyst taken periodically during the regeneration process were analyzed for metallic cobalt and cobaltosic oxide. The results of the analyses are summarized in Table II below.

TABLE II

| Sample No. | Time of sampling | Percent Co metal | Percent $Co_3O_4$ |
|---|---|---|---|
| 1 | Starting catalyst | 30.6 | 0.0 |
| 2 | After drying of catalyst | 30.4 | 0.0 |
| 3 | After 1 hour of contact at 600° C | 24.7 | 0.0 |
| 4 | At end of regeneration at 600° C | 0.0 | 43.5 |
| 5 | After extra 2 hours contact at 600° C | 0.0 | 43.4 |
|  | At end of 2 hour contact at 700° C | 0.0 | 42.9 |

The data in Table II, above, indicate that additional contacting of the catalyst wtih air at a temperature of about 700° C. had, in this case, no effect on the regeneration of the catalyst. Perhaps this was because the carbon normally remaining after catalyst regeneration was consumed by the additional oxidation at 600° C.

Example 3

A spent hydroformylation catalyst was fed to the ball-mill of Example 1, dried and contacted wtih air at a temperature of about 380° C. to about 400° C. until off-gas analysis indicated complete regeneration. The temperature was then raised to 500° C. and the contacting with air was continued for an additional two hours.

Periodic samples were taken and analyzed for cobalt metal and cobaltosic oxide. The results of the analyses are indicated in Table III.

TABLE III

| Sample No. | Time of sampling | Percent Co metal | Percent $Co_3O_4$ |
|---|---|---|---|
| 1 | Starting catalyst | 20.3 | 0.0 |
| 2 | After 3 hours contact at 380°–400° C. | 20.9 | 0.0 |
| 3 | At end of contact at 380°–400° C | 0.0 | 19.8 |
| 4 | At end of 2 hours at 500° C | 0.0 | 39.4 |

The data in Table III indicate that the contacting of the spent catalyst with air at a temperature less than abou 400° C. is ineffective for complete regeneration of a spent hydroformylation catalyst, i.e., only a fraction of the available cobalt is converted to the active oxide, cobaltosic oxide.

Thus, by my invention I have provided a novel process for regenerating a spent hydroformylation catalyst containing an oxide of cobalt which comprises drying the catalyst and contacting the dried catalyst with air at a temperature of about 400° C. to about 620° C. and thus converting a maximum amount of the cobalt to cobaltosic oxide ($Co_3O_4$), a highly active cobalt compound.

Although the invention has been described in considerable detail with references to certain preferred embodiments thereof, it will be understood that variations and modifications can be effected without departing from the spirit and scope of the invention as described hereinabove and as defined in the appended claims.

I claim:
1. The process of regenerating a spent cobalt oxide hydroformylation catalyst slurry which comprises:
 (a) drying the catalyst by heating it to a temperature of about 350° C. to about 400° C. and then
 (b) contacting the dried catalyst with oxygen at a temperature of about 400° C. to about 620° C., whereby conversion to cobaltosic oxide is maximized.
2. The process of regenerating a spent cobalt oxide hydroformylation catalyst slurry comprising a cobalt oxide in an organic slurry medium which comprises:
 (a) drying the catalyst by heating it at a temperature of about 350° C. to about 400° C. and
 (b) contacting the dried catalyst with oxygen at a temperature of about 400° C. to about 620° C., whereby conversion to cobaltosic oxide is maximized.
3. The process of claim 2 wherein the drying of the catalyst and the contacting of the catalyst with oxygen are carried out while the catalyst is being ground in a ball-mill.
4. The process of claim 3 wherein the catalyst is contacted with air.
5. The process of regenerating a spent hydroformylation catalyst slurry of a cobalt oxide and diatomaceous earth in an organic slurry medium which comprises, while grinding the spent catalyst in a ball-mill, the steps of:
 (a) drying the catalyst by heating it to a temperature of about 350° C. to about 400° C. while purging the ball-mill with an inert gas,
 (b) contacting the dried catalyst with air at a temperature of about 400° C. to about 620° C. until the off-gas from the ball-mill contains at least about

18 percent oxygen and no more than about 1 percent carbon dioxide,
(c) cooling the dried regenerated catalyst to about 200° C. while continuing to contact the catalyst with air and then
(d) purging the ball-mill with inert gas.

References Cited

UNITED STATES PATENTS

| | | | |
|---|---|---|---|
| 2,817,669 | 12/1957 | Bowditch et al. | 260—604 |
| 2,626,246 | 1/1953 | Naragon et al. | 260—604 |
| 2,073,638 | 3/1937 | Houdry | 252—416 |
| 2,704,281 | 3/1955 | Appell | 252—416 |
| 2,941,954 | 6/1960 | Wilkes | 252—416 |
| 2,307,895 | 1/1943 | Naiman et al. | 254—416 |
| 1,987,903 | 1/1935 | Houdry | 252—416 |
| 2,683,177 | 7/1954 | Field | 260—604 |

DANIEL E. WYMAN, Primary Examiner

P. E. KONOPKA, Assistant Examiner

U.S. Cl. X.R.

260—483, 497, 604, 638